United States Patent

[11] 3,621,136

[72] Inventor Robert K. Stanwood
Woodbridge, Va.
[21] Appl. No. 856,760
[22] Filed Sept. 10, 1969
[45] Patented Nov. 16, 1971
[73] Assignee The United States of America as represented by the Secretary of the Navy

[54] AUTOMATIC OPTICAL-FOCUSING SYSTEM FOR TV CAMERAS
8 Claims, 2 Drawing Figs.

[52] U.S. Cl. .......... 178/7.92, 178/DIG. 29
[51] Int. Cl. .......... H04m 5/00
[50] Field of Search .......... 178/DIG. 29, 7.2 R, 7.92

[56] References Cited
UNITED STATES PATENTS

| | | | |
|---|---|---|---|
| 2,403,628 | 7/1946 | Beers | 178/7.2 E |
| 2,831,057 | 4/1958 | Orthuber | 178/7.2 E |
| 2,838,600 | 6/1958 | Salinger | 178/7.2 E |
| 2,999,436 | 8/1961 | Faulhaber | 178/7.2 E |
| 3,211,831 | 10/1965 | Steiner | 178/7.2 E |

*Primary Examiner*—Robert L. Griffin
*Assistant Examiner*—Donald E. Stout
*Attorneys*—R. I. Tompkins, Arthur L. Branning and J. G. Murray

ABSTRACT: Apparatus for automatically focusing a television camera. The video signal output of the camera is successively differentiated, integrated and differentiated to produce signals which are utilized by a logic circuit to drive a motor that controls the focus of the camera.

INVENTOR
ROBERT K. STANWOOD

BY James G Murray
R. J. Erickson
ATTORNEYS

PATENTED NOV 16 1971 3,621,136

LOGIC CIRCUIT 28

INVENTOR
ROBERT K. STANWOOD

BY James G. Murray
R. J. Eickson
ATTORNEYS

AUTOMATIC OPTICAL-FOCUSING SYSTEM FOR TV CAMERAS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In the past several decades, the use of television cameras has greatly increased, both with respect to absolute numbers of camera in use and with respect to the diversity of utilization. In some of these diversified uses, such as earth-viewing TV cameras on orbital satellites, military and civilian surveillance of fixed points for intruders, medicinal (internal-body) viewing, etc., there is no need to change the camera focus and fixed focus cameras are often used.

In many other uses, such as commercial TV, docking (joining) of space craft, deep sea viewing, etc., where the distance between the camera and the viewed object changes (often rapidly) from the "infinity" accommodation of the camera lens to "close-up" views, the television camera must have provisions for changing the focus of the camera. Usually the changing of focus involves either moving the camera viewing tube with respect to the camera lens or moving the lens with respect to the tube.

Heretofore, optical focusing of TV cameras has been accomplished manually. Manual operation has the obvious disadvantage of requiring extra manpower and apparatus, i.e. camera operator and a monitor and the less obvious disadvantage that a human operator does not always obtain the optimum focus.

SUMMARY OF THE INVENTION

The invention disclosed herein overcomes the disadvantages of the manual procedures previously used by providing apparatus which automatically focuses television cameras. This advantageous result is accomplished by connecting the video signal of the television camera to successive stages of differentiation, integration and differentiation that produce focusing control signals that operate through a logic circuit to drive a focusing motor which relatively positions the camera lens to the camera electronic viewing tube so as to produce optimum focusing. More specifically, particularly in the electronic sense, the optimum focusing is obtained by maximizing the output of the integration stage of the circuit.

OBJECTS OF THE INVENTION

It is therefore an object of the invention to provide an improved arrangement for focusing a television camera.

Another object of the invention is to provide apparatus which automatically focuses a TV camera.

Yet another object of the invention is the provision of an electronic circuit having successive stages of differentiation, integration and differentiation which operates on a TV camera video signal to produce control signals that are used to drive a focusing motor in such a manner as to optimally and automatically focus the camera.

DESCRIPTION OF THE DRAWINGS

Other objects and advantages of the invention will hereinafter become more fully apparent from the following description and the annexed drawings, which illustrate a preferred embodiment, and wherein.

DESCRIPTION OF THE PREFERRED EMBODIMENT

Figure 1:
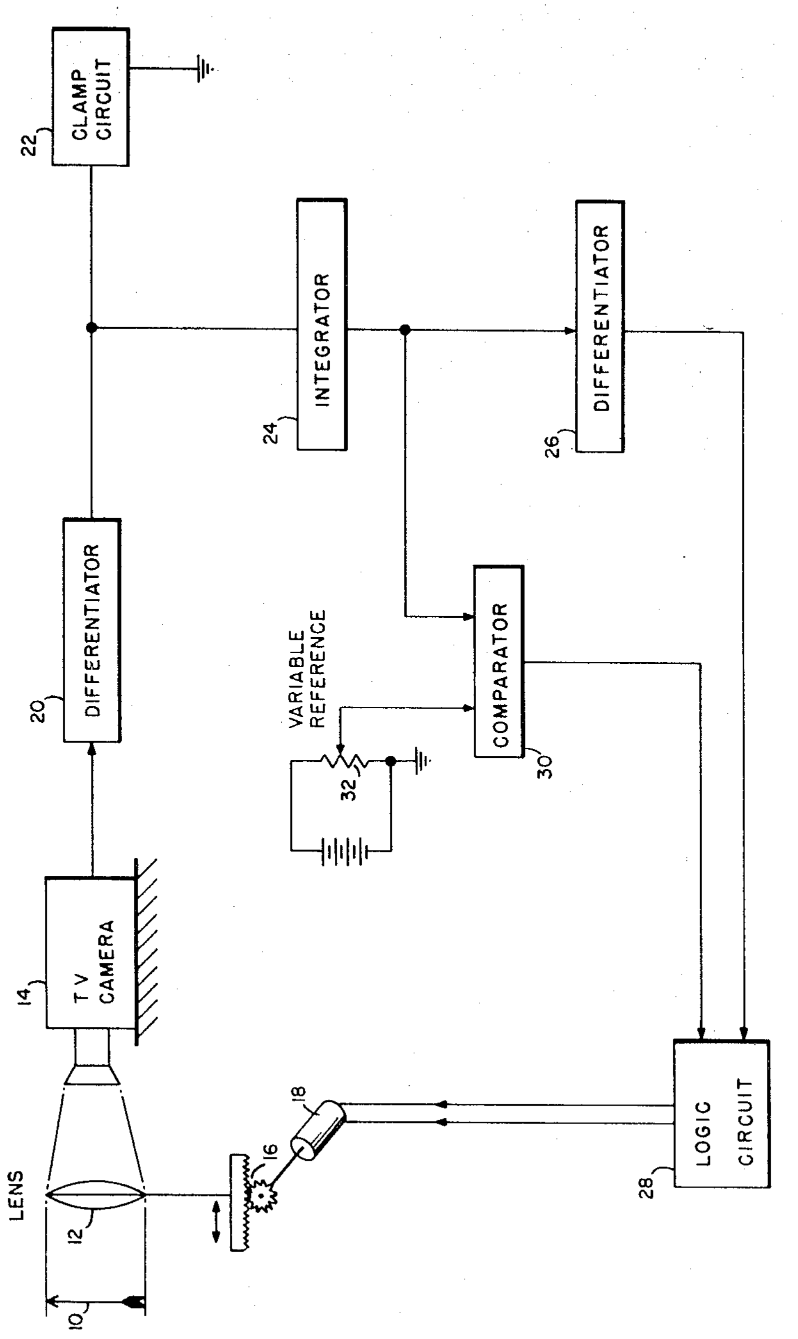
FIG. 1 illustrates the invention in block diagram form.

In FIG. 1, which shows the invention in block diagram form, the scene being televised is symbolically illustrated by the arrow 10. Scene 10 is projected by the lens system 12 onto the viewing tube in camera 14. As shown, the lens 12 is positioned by the mechanical means 16 which is energized by electric focusing motor 18. The obvious focusing variation of moving the viewing tube relative to a fixed lens will, of course, immediately occur to the reader.

The video output signal of camera 14 is connected to differentiator 20, the output of which is connected to ground through conventional clamping circuit 22. Another focusing expedient which would probably occur to the reader, and the implementation of which would involve nothing beyond the capability of one ordinarily skilled in the electronic arts, is to gate, or pass, only that part of the video signal which relates to a certain portion of the scene 10. For example, the operator may wish to use only that part of the video signal which relates to the top (arrow head) part of scene 10. Such an expedient would allow the focusing (by means soon to be described) to the lens 12, camera 14 combination to be related to a particular part of the televised scene and in many instances would provide superior results, for example, in the television assists to helicopter pilots wishing to lock the focus on a particular object, such as the landing area.

As is well known, the camera video signal (i.e. the input to differentiator 20) is a sequence of different voltage levels representative of the light intensity of the various increments of the image of scene 10 as scanned by the viewing tube of the camera 14. The output of differentiator 20 relates to the changes in the voltage level in the camera video signal and, because of the clamping action of circuit 22, both the black-white and white-black changes in the video signal act to charge the integrator 24. It has been found that the amplitudes of the output signal of differentiator 20 are proportional to the abruptness of the scene change (i.e. the focus) projected on the viewing tube of camera 14. The theoretical basis for the present invention is that an optimization of the focus and the maximization of the output signal of differentiator 20 occur simultaneously.

Integrator 24 is of the so-called "leaky" type which has the property that when its input is removed, its output will fall slowly to zero. In other words, integrator 24 has a medium time constant rather than the nearly infinite time constant generally found in integrators.

The output of integrator 24 is necessarily either rising, falling or stable. Neglecting for the moment the effects of integrator leakage, it will be apparent that a rising output of integrator 24 is indicative that focusing is approaching the optimum; a falling output is indicative that focusing is proceeding from the optimum and a stable integrator output is indicative that the optimum focusing has been achieved. The rising, falling or stable output of integrator 24 is operated on by differentiator 26 to produce a signal which is positive, negative or zero respectively. This signal is connected to a logic circuit 28 which, in turn, controls the positioning of lens 12.

Obviously the effects of integrator leakage can not be entirely neglected. For example, a zero output signal by differentiator 26 could be indicative of both optimum focusing and of complete leakage by the integrator following the loss of an integrator input signal due to a complete loss of focus. It is therefore necessary that logic circuit 28 also receive an input related to the output potential of integrator 24. For this purpose, comparator 30 is connected to receive the output of integrator 24 and a variable reference potential from the potentiometer 32. This potentiometer is manually adjusted on a try-and-see basis to obtain good results and, in general, to match the integrator 24 output for an acceptable focusing level. It will be apparent to the reader that the optimum reference voltage is a complex function of video signal content, integrator time constant (leakage) and the performance parameters of the lens 12, camera 14 combination. Comparator 30 produces a constant voltage output signal (which is connected as the second input to logic circuit 28) only when the output of integrator 24 is below the reference potential from potentiometer 32.

Logic circuit 28 could routinely be designed in any one of many possible forms, such as an analog circuit using relays, or an analog circuit using semiconductors or a digital motor drive circuit, etc. As an example of the later, only seven discrete steps are required to focus from infinity to 30 feet for a certain fast lens. A digital circuit may be constructed to place the lens only in these discrete positions so as to allow faster automatic focus operation. In addition, once defocused, the scene is more likely to be refocused in adjacent lens positions i.e. one step near or one step far, less likely in two steps near or two steps far etc. Therefore, an optimum stepping sequence may be programmed into a logic circuit to allow even faster operation. The particular choice of the form of logic circuit 28 will necessarily relate to the environment of the television system and will depend on consideration of reliability, cost, weight, required rapidity and precision of focus, etc., the most important and almost sole requirement of the design selected being that logic circuit 28 (whatever its form) drive focusing motor 18 to a position where the output of integrator 24 is maximized.

Figure 2:
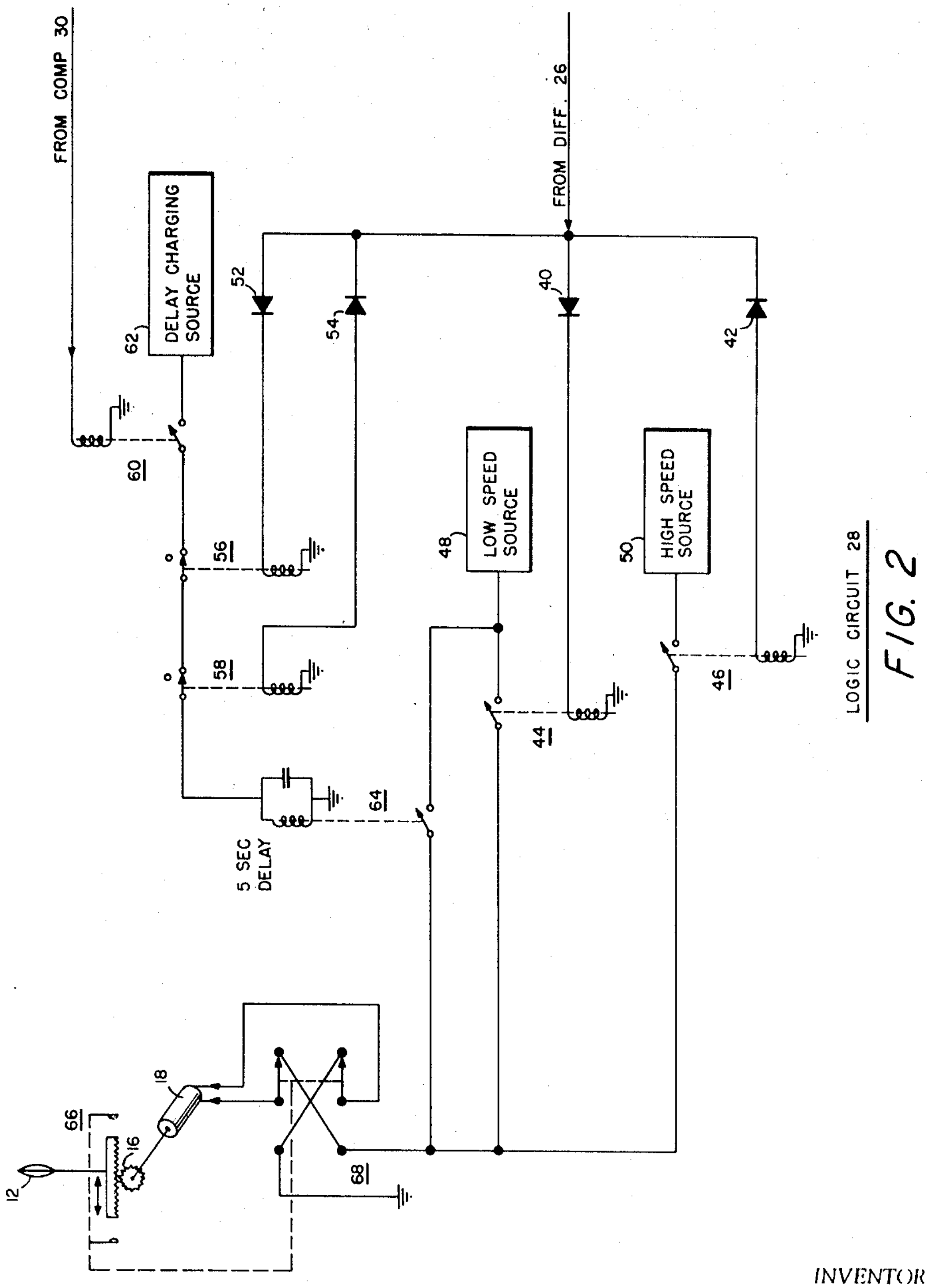
FIG. 2 shows a logic circuit suitable for use in the invention.

FIG. 2 illustrates an analog relay circuit suitable for use as the logic circuit 28 in FIG. 1. As shown in FIG. 2, the output from differentiator 26 is connected through semiconductors 40 and 42 to the energizing coils of normally open relay switches 44 and 46. When the signal from the differentiator 26 is positive, i.e. the focus is approaching optimum, the relay 44 is energized to close and thereby connect a potential source 48 to drive focusing motor 18 at a lower speed. Similarly, when the signal from differentiator 26 is negative, i.e. the focus is proceeding from the optimum, the relay 46 is energized to close and thereby connect a potential source 50 to drive focusing motor 18 at a higher speed.

The signal from differentiator 26 is also connected, through semiconductors 52 and 54, to the normally closed relay switches 56 and 58. When the signal from differentiator 26 is positive, switch relay 56 is energized to open and when the differentiator signal is negative, the relay 58 is opened. Normally open switch relay 60 is connected, as shown, in series with the switch relays 56 and 58 and is energized to close by a signal from comparator 30 which, as the reader will recall, occurs only when the output of integrator 24 is below the reference potential from adjustable potentiometer 32. When all of the switch relays 56, 58 and 60 are closed, a source of charging potential 62 is connected to the 5-second delay relay switch 64. Upon being energized for five seconds by source 62, relay switch 64, which is normally open, closes and connects potential source 48 to drive focusing motor 18 at the lower speed.

As shown in FIG. 2, the movement of lens 12 and rack 16 is confined by limiting means 66 (which can be either mechanical or electrical in form) that controls reversing switch 68 which in turn controls the operational direction of focusing motor 18.

As previously mentioned, a zero input into the integrator 24 causes the integrator output to remain stable and the differentiator 26 to become zero; these conditions can be caused by either proper optimum focusing or a complete loss of focus. Obviously, there is a need to check for this second situation of complete loss of focus. Therefore the integrator 24 is designed as aforementioned to be of a leaky type. The output of the integrator 24 is compared with a variable reference voltage, which represents a try-and-see adjustment of the focusing from potentiometer 32. Thus, when differentiator 26 output is zero and the integrator input is zero, indicating that the camera is in focus or that the focus has been lost completely, the output of the integrator will slowly leak off to a point when the variable reference voltage exceeds that of the integrator output, the comparator 30 then provides a signal which closes relay 60. As relays 56 and 58 are closed due to a zero output from differentiator 26, when relay 60 closes the 5-second delay, relay 64 is activated. At the end of the delay the low speed source 48 is connected to drive focusing motor 18 at the lower speed. Now should the focus have been lost completely, say by a sudden range change, the focusing motor 18 will be driven in a scanning fashion to locate the range of proper focus. But should the camera have been in proper focus at the time the focusing motor 18 begins drive, there will be an immediate signal generated to charge integrator 24 which will cause an error signal at the output of differentiator 26. The output from differentiator 26 will open either relay 56 or 58 thereby causing relay 64 to open. Then the camera will be automatically refocused as explained before.

It should be noted that as long as the camera remains in proper optimum focus, the integrator 24 will charge to a stable valve and begin to leak off thus causing the cycle to repeat at regular intervals in order that a check is made for complete loss of focus. Many variations of FIG. 2 will no doubt occur to the reader. For example, the relays 44 and 56 and the relays 46 and 58 could obviously be reduced to only two relays. Another obvious expedient would be to use a shaped potentiometer to control the speed of motor 18 to be slower in the middle of the range of travel, i.e. where the likelihood of optimum focusing is higher.

By now the operation of the disclosed embodiment of the invention is probably apparent. View 10 is focused by the adjustable lens 12 of the TV camera 14, the output signal of which is differentiated by component 20. The output of differentiator 20 is related to the quality of the focusing by the lens-camera 12–14 or, more precisely, the voltage variation in the output of camera 14 which, in turn, is directly related to the sharpness (contrast) of the view delivered to camera 14 by the lens 12. After ground clamping (component 22), the output of differentiator 20 is integrated and differentiated by components 24 and 26 to provide one input signal to logic circuit 28. The other input to this logic circuit is provide by component 30 which compares the output of integrator 24 and a variable reference voltage from component 32 and produces a signal whenever the variable reference 32 exceeds the output of integrator 24.

If the logic circuit 28 is in the form illustrated in FIG. 2, when the output of differentiator 26 is positive, i.e., when motor 18 is driving lens 12 in a direction that improves the focus, the motor is energized through switch 44 by source 48 to operate at a slower speed. When the output of differentiator 26 is negative, i.e. when motor 18 is driving lens 12 is a direction that degrades the focus, the motor is energized through switch 46 by source 50 to operate at a higher speed which will continue until limiting device 66 and reversing switch 68 cause the motor 18 to change it's direction. When optimum focusing is obtained, the output of differentiator 26 becomes zero whereupon the motor 18 is no longer energized and the lens 12 is stopped.

A zero output by differentiator 26 can also signify the loss of focus, in which event the output of integrator 24 is less than the variable reference 32 and comparator 30 then produces a signal. In this circumstance source 62 energizes relay 64 through switches 56, 58, and 60 and (after a 5-second delay) relay 64 closes and source 48 energizes motor 18 to hunt, i.e. cycle at low speed through the travel range established by limit device 66, which causes switch 68 to reverse the direction of motion of motor 18 and lens 12 when the limit travel is reached.

There has been disclosed a TV-camera system wherein the TV camera video signal is successively operated on by stages of differentiation, integration and differentiation to produce control signals which are used to drive a focusing motor in such a manner as to optimally and automatically focus the camera. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A system for automatically focusing a TV camera having an adjustable focus and producing a video output signal comprising:

drive motor means connected to said TV camera adjustable focus and capable of being energized to drive said adjustable focus in either of two directions;

circuit means connected to receive said TV camera video output signal and functioning to produce one or more circuit output signals which are indicative of whether the focus of said TV camera is improving or becoming worse, and logic circuit means connected to receive said one or more circuit means output signals and functioning to energize said drive motor means, wherein said circuit means includes a first differentiator, an integrator and a second differentiator connected in series between said TV camera and said logic circuit means.

2. The system of claim 1 wherein said circuit means further includes a source of variable reference potential and comparator means connected to said source of variable reference potential, said integrator, and said logic circuit; and functioning to supply a signal to said logic circuit whenever said reference potential exceeds the output of said integrator.

3. The system of claim 2 wherein said circuit means further includes a clamp circuit connected between the output of said first differentiator and ground reference potential.

4. The system of claim 2 wherein said logic circuit means includes limit and reverse switching means which control said drive motor means to drive said TV camera adjustable means only within predetermined limits and to reverse the direction of drive as said predetermined limits are reached.

5. The system of claim 4 wherein said logic circuit means energizes said drive motor means to operate at a higher speed if said circuit means output signal are indicative of a worsening focus of said TV camera or at a lower speed if said circuit means output signals are either indicative of an improving focus of said TV camera or are indicative that the focus of said TV camera is very bad.

6. A system for automatically focusing a TV camera having an adjustable focus and producing a video output signal, comprising:

Circuit means connected to receive said TV camera video output signal and functioning to produce first and second output signals which are indicative of the condition of the focus of said TV camera;

A focusing motor having input leads and connected to said TV camera adjustable focus and capable of operating at higher and lower speed in two directions;

A reversing switch connected in the input leads of said focusing motor;

Limiting means connected to control said reversing switch and functioning to throw said reversing switch whenever said TV camera adjustable focus reaches either of two predetermined limits and Logic circuit means connected to receive said first and second circuit means output signals and to energize said input leads of said focusing motor and functioning to energize said focusing motor input leads for higher speeds if said circuit means output signals are indicative of a worsening focus of said TV camera or to energize said focusing motor input leads for lower speeds if said circuit means output signals are either indicative of an improving focus of said TV camera or are indicative that the focus of said TV camera is very bad.

7. The system of claim 6 wherein said logic circuit means includes

A high-speed energy source;

A low-speed energy source and

Relay means connected to be controlled by the polarity of said first circuit means output signal to connect either said high-speed energy source or said low-speed energy source to energize said focusing motor input leads if said first output signal is not zero.

8. A system for automatically focusing a TV camera having an adjustable focus and producing a video output signal comprising:

drive motor means connected to said TV camera adjustable focus and capable of being energized to drive said adjustable focus in either of two directions;

circuit means connected to receive said TV camera video output signal and functioning to produce one or more circuit output signals which are indicative of whether the focus of said TV camera is improving or becoming worse, and logic circuit means connected to receive said one or more circuit means output signals and functioning to energize said drive motor means, said drive motor means being capable of being driven at least at two different speeds in response to said logic circuit means, said two different speeds being a first speed in response to an improving signal focus and a second speed in response to a signal focus which is becoming worse.

* * * * *